United States Patent [19]
Mower

[11] Patent Number: 5,718,532
[45] Date of Patent: Feb. 17, 1998

[54] DEVICE AND METHOD FOR TERMINATING FLEXIBLE TENSILE STRENGTH MEMBERS

[75] Inventor: Todd M. Mower, Kensington, N.H.

[73] Assignee: Massachusetts Institute of Technology, Cambridge, Mass.

[21] Appl. No.: 654,538

[22] Filed: May 29, 1996

[51] Int. Cl.[6] .......................................... F16B 2/14
[52] U.S. Cl. .......................................... 403/269; 403/265
[58] Field of Search .......................... 403/269, 268, 403/267, 265

[56] References Cited

U.S. PATENT DOCUMENTS

| 4,184,784 | 1/1980 | Killian | 403/267 |
| 5,525,003 | 6/1996 | Williams et al. | 403/267 |

OTHER PUBLICATIONS

Mower, Todd M., "On the Development of Highly Efficient Terminations for Synthetic-Fiber Tensile Members", presented and disseminated at the Proceedings of the 14th International Conference on OMAE (Offshore Mechanics and Artic Engineering) 1995 held Jun. 18–22, 1995 in Copenhagen, Denmark, and published on June 18, 1995 by the ASME in the *Proceedings of the 14th International Conference on OMAE 1995, vol. I, Part B, Offshore Technology*, pp. 423–433.

Primary Examiner—Anthony Knight
Attorney, Agent, or Firm—Testa, Hurwitz & Thibeault, LLP

[57] ABSTRACT

A termination device for a flexible tensile strength member has an internal surface which defines a passage through the device. The profile of the internal surface is a constant-radius arc extending from one end of the device to the other end. The radius of the arc emanates from a point of origin located along a line that is both collinear with an end of the device and perpendicular to its longitudinal axis. The design can be optimized either to provide a minimum device outer diameter while generating a high efficiency (greater than 90 percent), or to generate maximum possible efficiency within a device that is minimized in diameter (and wall thickness) while preventing device failure.

14 Claims, 6 Drawing Sheets

5,718,532

1

DEVICE AND METHOD FOR TERMINATING FLEXIBLE TENSILE STRENGTH MEMBERS

STATEMENT REGARDING FEDERALLY SPONSORED RESEARCH

This invention was made with government support under Contract No. F19628-95C-0002 awarded by the Department of the Air Force. The government may have certain rights in the invention.

TECHNICAL FIELD

This invention relates to devices and methods for terminating flexible tensile strength members and, more particularly, to terminations having an internal profile which includes a constant-radius arc.

BACKGROUND INFORMATION

Efficient use of flexible tensile strength members (SMs), such as ropes and cables, requires the ability to transfer loads approaching the ultimate strength of the SM to mating structures through end-fittings or terminations. A mechanical means, such as threads, a pin hole, or a bearing surface, is typically used to connect a termination to an external structure. Devices for terminating flexible tensile SMs are known. These known devices generally have a cylindrical metal fitting within which the SM is cast in a polymer resin to form a termination. The load is then transferred from the SM to an external structure via the termination.

Referring to FIGS. 1A and 1B, a known termination device 10 has a conical interior surface 11 and a cylindrical throat 12. The straight, tapered internal wall 14 forming the conical interior surface 11 creates a cusp 16 at the intersection of the tapered internal wall 14 with the cylindrical throat 12 of the termination device 10. The method of terminating the SM includes the steps of passing the SM through the conical termination device 10, separating the individual fibers at the end of the SM being terminated, coating the individual fibers with a suitable resin to form a fiber/resin composite, securely positioning the fiber/resin composite within the conical termination device 10 and curing the resin.

The device 10 has several disadvantages. For example, the external diameter "D" of the conical termination device 10 is typically between three and four times the diameter of the SM being terminated, and the length "L" of the device is typically between four and ten times the diameter of the SM being terminated. Also, the efficiency ($\eta$) of the conical termination device 10 ranges between 70 and 85 percent. The conical termination device 10 does not generate higher efficiencies because the cusp 16 creates a highly concentrated region of stress that promotes premature failure of the fiber/resin composite located within the conical termination device 10. In addition, the conical termination device 10 has greatly reduced load capacities which are caused by abrasive relative motion between the fiber/resin composite and the conical termination device 10 near the cusp 16.

U.S. Pat. No. 4,184,784 to Killian discloses terminating ropes or cables of aramid fiber. The termination is an annular collar with a tapered tube or stopper. The annular collar has an interior channel which is contoured in a varying taper from a minimum diameter at one end of the collar to a larger diameter at the opposite end of the collar. The tapered stopper varies in diameter from a minimum diameter at one end to a substantially larger diameter at the opposite end. The rope or cable is terminated by passing the rope or cable through the collar, separating the individual strands of the rope or cable, dipping the separated strands into an epoxy resin, and positioning the tapered stopper within the collar such that the individual strands of the rope or cable are secured between the collar and the stopper.

In general, known termination devices are subject to at least one of the following shortcomings: having a large external diameter relative to the diameter of the SM being terminated; having a length substantially longer than the diameter of the SM being terminated; having a low efficiency; and having poor reliability (high scatter of failure loads).

SUMMARY OF THE INVENTION

It is an object of the invention to provide a termination device that is as small as possible yet demonstrates nearly ideal (close to 100%) efficiency. Termination devices of small size and high efficiency are made possible by, according to the invention, an inner passage having a special constant-radius arc contour.

In one aspect, the invention relates to a termination device for a flexible tensile strength member. The device includes a first end, a second end located opposite the first end, and an internal surface defining a passage through the device. The internal surface has a profile which is a constant-radius arc extending from the first end to the second end of the device. The radius of the arc preferably emanates from a point along a line which is both collinear with the second end of the device and perpendicular to the longitudinal axis of the device.

In another aspect of the invention, the termination device includes a first portion with a first end and a second end, a second portion extending from the second end of the first portion, and an internal surface defining a passage through the first and second portions of the device. The internal surface of the first portion has the constant-radius arc profile which extends from the first end to the second end of the first portion of the device. Again, the radius of the arc preferably emanates from a point along a line which is both collinear with the second end of the device and perpendicular to the longitudinal axis of the device. The internal surface of the second portion of the device can be, for example and unlike the constant-radius arc profile of the internal surface of the first portion, a straight-walled cylindrical surface.

Embodiments of these aspects of the invention can include the following features. The portion of the device with the constant-radius arc has a length L, the passage has a diameter d at the second end, and the arc has a radius R. The radius R is related to the diameter d according to the equation $7d \geq R \geq 5d$, and the length L is related to the diameter d according to the equation $L \geq 2.5d$. In some preferred embodiments, the radius R is related to the diameter d according to the equation $7d \geq R \geq 6d$, and the length L is related to the diameter d according to the equation $L \geq 2.5d$. In some other preferred embodiments, the radius R is related to the diameter d according to the equation $6d \geq R \geq 5d$, and the length L is related to the diameter d according to the equation $L \geq 2.5d$.

In yet another aspect, the invention involves a method of terminating a flexible tensile strength member. The method includes providing a termination device according to the invention, and then inserting the flexible tensile strength member through the passage of the device. An end of the flexible tensile strength member is coated with a potting compound, and the potting compound is cured. The end of the flexible tensile strength member thus is held in, and terminated by, the termination device.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 2A:
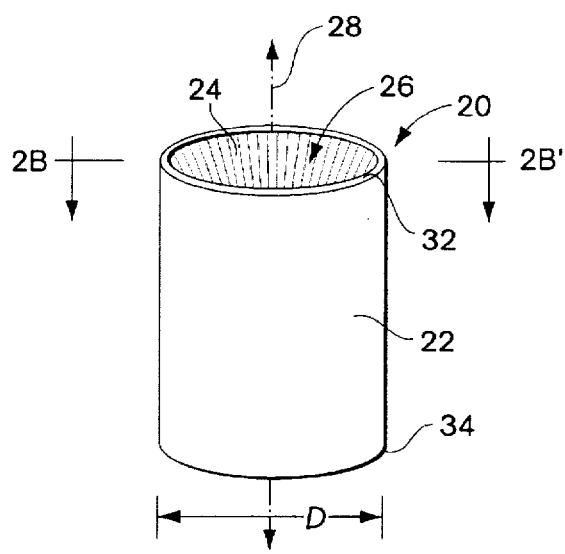
FIG. 2A is a perspective view of an embodiment of a termination device according to the invention having an internal profile which is a constant-radius arc.
Figure 2B:
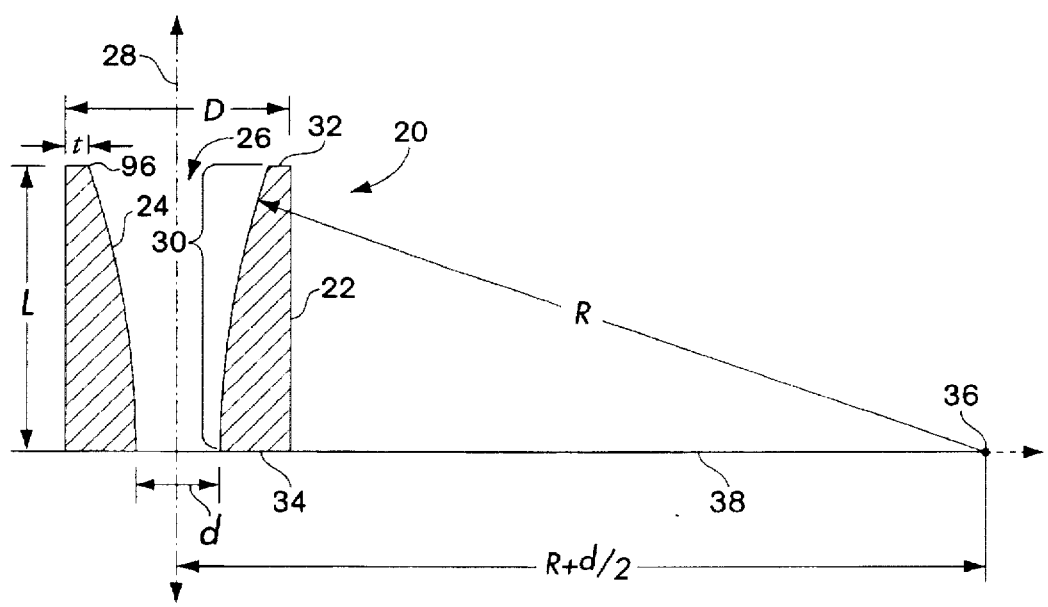
FIG. 2B is a cross-sectional view of the device of FIG. 2A taken through line 2B–2B' of FIG. 2A.

Referring to FIGS. 2A and 2B, an embodiment of a termination device 20 for terminating a flexible tensile SM according to the present invention includes an external surface 22 and an internal surface 24. The internal surface 24 defines a passage 26 through the termination device 20. An axis 28 extends through the center of the passage 26. The internal surface 24 has a profile 30 which is (or, less preferably, is approximately or about) a constant-radius arc extending from the first end 32 of the termination device 20 to the second end 34 of the termination device 20. The passage 26 at the second end 34 of the termination device 20 has a diameter "d" about equal to the diameter of the SM being terminated. The radius "R" of the constant-radius arc emanates from a point of origin 36. The point of origin 36 is located along a line 38 that is collinear with the second end 34 of the termination device 20, intersects the axis 28 and is perpendicular to the axis 28. The point of origin 36 is located along line 38 at a distance from the axis 28 equal to the sum of the length of the radius "R" and one-half the diameter "d" of the passage 26. In three dimensional space, the line 38 is coplanar with the second end 34 of the termination device 20, intersects the axis 28 and is perpendicular to the axis 28.

Typically, the termination device 20 is formed out of one piece of material. However, the termination device 20 may be formed out of multiple pieces of material joined together. In a preferred embodiment, the termination device 20 is made of metal. Selecting a material for the termination device 20 is discussed in more detail below.

Figure 3A:
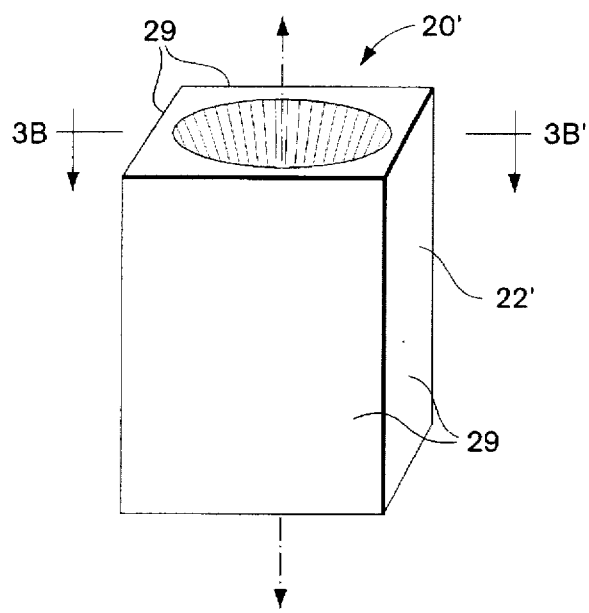
FIG. 3A is a view of another embodiment of a termination device according to the invention having square-shaped external surface and an internal profile which is a constant-radius arc.
Figure 3B:
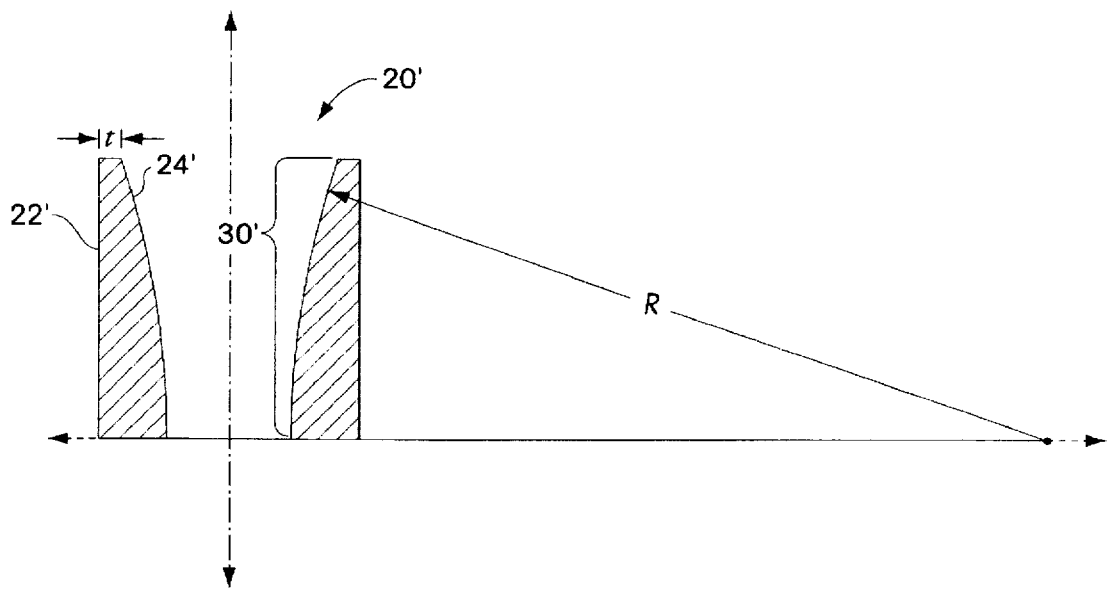
FIG. 3B is a cross-sectional view of the device of FIG. 3A taken through line 3B–3B' of FIG. 3A.

The constant-radius arc termination device 20 may come in many different sizes and shapes and still fall within the scope of the invention. FIG. 2A shows the external surface 22 of termination device 20 having a cylindrical shape with an outer diameter "D". FIGS. 3A and 3B show another embodiment of a constant-radius arc termination device 20' according to the invention having a square-shaped external surface 22' composed of four substantially square planar surfaces 29. As in the embodiment shown in FIGS. 2A and 2B, the internal surface 24' of termination device 20' has a profile 30' which approximates a constant-radius arc. The external surface 22 may also be any other shape so long as the minimum wall thickness "t" of the constant-radius arc termination device 20 between the external surface 22 and the internal surface 24 is sufficient to avoid breaking of the device 20. A method for determining sufficient wall thickness "t" is described in detail below.

Figure 4A:
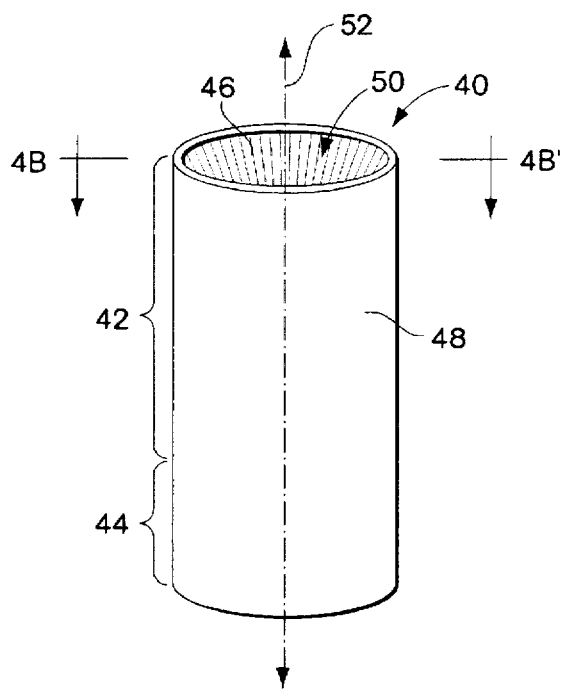
FIG. 4A is a perspective view of an embodiment of a termination device according to the invention having an internal profile which in part is a constant-radius arc.
Figure 4B:
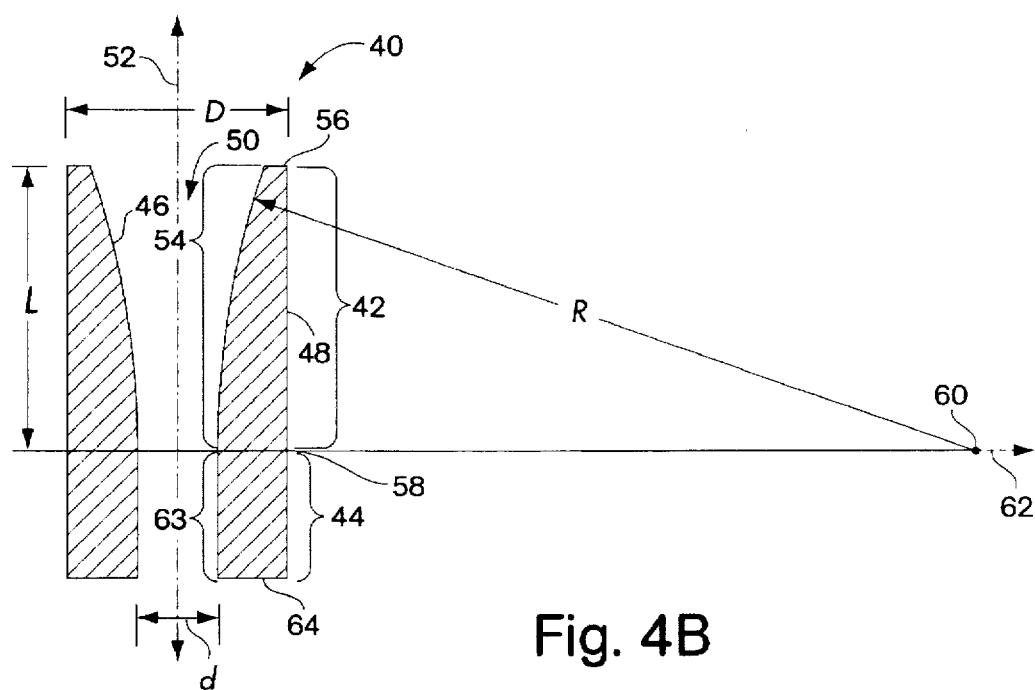
FIG. 4B is a cross-sectional view of the device of FIG. 4A taken through line 4B–4B' of FIG. 4A.

Referring to FIGS. 4A and 4B, another embodiment of a constant-radius arc termination device 40 according to the invention includes an internal curved portion 42 and a throat portion 44. The device 40 has an internal surface 46 and an external surface 48. The internal surface 46 defines a passage 50 through the termination device 40. An axis 52 extends through the center of the passage 50. Typically, the termination device 40 is a unitary part formed out of one piece of material. However, the termination device 40 may also be formed out of multiple pieces of material joined together. The curved portion 42 has an internal profile 54 which is (or, less preferably, is approximately or about) a constant-radius arc extending from the first end 56 of the internally carved portion 42 to the second end 58 of the curved portion 42. The internal profile 54 of the termination device 40 is identical to the internal profile 30 of termination device 20 shown in FIGS. 2A and 2B. The passage 50 at the second end 58 of the curved internal portion 42 has a diameter "d". Diameter "d" is approximately equal to the diameter of the SM being terminated. The radius "R" of the constant-radius arc emanates from a point of origin 60. The point of origin 60 is located along a line 62 that is collinear with the second end 58 of the internally curved portion 42, intersects the axis 52 and is perpendicular to the axis 52. The point of origin 60 is located along line 62 at a distance from the axis 52 equal to the sum of the length of the radius "R" and one-half the diameter "d" of passage 50. In three dimensional space, the line 62 is coplanar with the second end 58 of the internally curved portion 42, intersects the axis 52 and is perpendicular to the axis 52.

FIG. 4B shows the throat portion 44 having an internal profile 63 which is substantially linear such that the inner wall of that portion 44 is cylindrical. The throat portion 44 begins at the second end 58 of the internally curved portion 42. In the embodiment shown in FIG. 4B, the second end 64 of the throat portion 44 is substantially flat. In other embodiments, the second end 64 of the throat portion 44 may be concave, convex, tapered to a point, or shaped otherwise.

Figure 5:
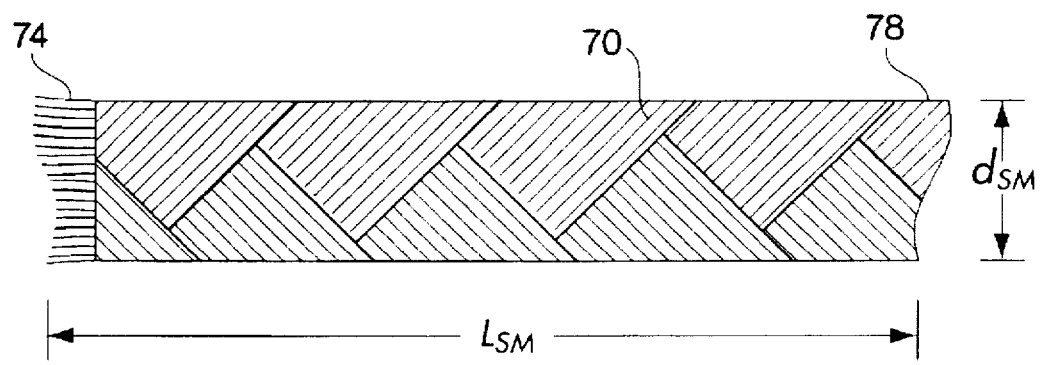
FIG. 5 is a side view of a flexible tensile strength member.

Referring to FIG. 5, a flexible tensile SM 70 to be terminated with a termination device has an approximate length "$L_{sm}$" and a diameter "$d_{sm}$". In one embodiment, the flexible tensile SM 70 is composed of synthetic fibers.

Figure 6:
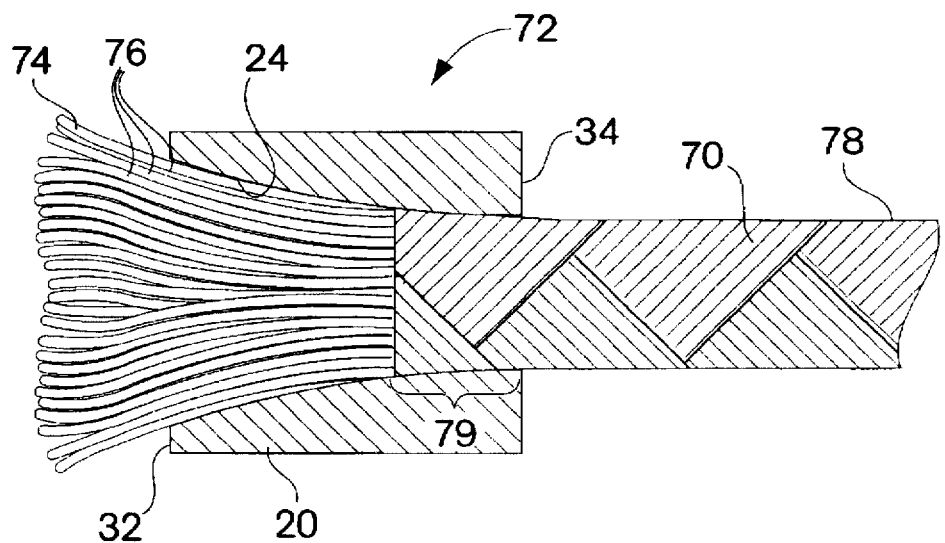
FIG. 6 is a side view, partly in section, of a flexible tensile strength member extending through the device of FIGS. 2A and 2B after the fibers of the tensile strength member have been dipped in a potting resin and secured within the termination device.

Referring to FIG. 6, a termination 72 includes a constant-radius arc termination device 20, a length of SM 70, and potting resin. The constant-radius arc termination device 20 is described above and shown in FIGS. 2A and 2B. The termination 72 terminates one end 74 of the SM 70 shown in FIG. 5. To assemble termination 72, SM 70 is initially pulled through constant-radius arc termination device 20 such that the end 74 being terminated extends through the termination device 20 and projects from the first end 32 of termination device 20. The fibers 76 of the SM 70 are then broomed within the termination device 20 until they are substantially separated into individual fibers as shown in FIG. 6. As used herein, the term "broomed" means separated apart. The separated fibers 76 are then coated in a suitable polymer resin such as Socket-Fast Blue® or Phyllistran A-20 resin and catalyst distributed by Phyllistran. Socket-Fast Blue® is a polyester resin. Polyester resins have low viscosity and cure in a short mount of time. In other embodiments, the separated fibers 76 may be coated in an epoxy resin. In one embodiment, the individual fibers 76 are coated by being dipped in the resin. The second end 78 of SM 70 is then pulled to the right, thereby tightly wedging the resin-coated fibers 76 plus a length of braided rope 79 into the constant-radius-arc termination device 20, as shown in FIG. 6. In another embodiment, the individual fibers 76 are broomed within the termination device 20 and the resin is applied to the fibers 76 with a syringe until the internal passage 26 through the termination device 20 is completely filled with resin. After the individual fibers 76 are coated with resin, the resin is cured to form a fiber/resin composite within the termination device 20. In one embodiment of the method of the present invention, to cure the resin, the termination 72 is placed in an oven until the resin begins to set. At this point any of the individual fibers 76 extending beyond the first end 32 of termination device 20 may be trimmed. The termination 72 is then replaced in the oven until the resin has completely set. In another embodiment, rather than placing the termination 72 into an oven, the resin is cured in ambient air.

In a preferred embodiment, the internal surface 24 of the termination device 20 is first (before the SM 70 is passed therethrough) coated with a mold release agent, thereby preventing adhesion of the resin to the internal surface 24 of the termination device 20. This step eliminates one source of fracture initiation in the resin during subsequent use of the termination 72 and loading of the SM 70. In other embodiments, no release agent or other surface modifier is applied to the internal surface 24 of the termination device 20.

Design of Highly Efficient Termination Devices:

The constant-radius arc termination device 20 described above and shown in FIGS. 2A and 2B was designed during a research effort to develop high-efficiency terminations for small diameter synthetic-fiber tensile SMs. A second goal of the research effort was to develop terminations having a minimum size. The research effort followed an iterative procedure of design, analysis, fabrication and testing to develop the optimum termination device. The internal contours of the termination devices tested progressed from conical termination device 10 described above and shown in FIGS. 1A and 1B, through termination devices having a rounded transition region at cusp 164 of conical termination device 10, to the ultimate design of the present invention which has an internal profile which approximates a constant-radius arc.

Finite Element Stress Analysis:

A commercial finite element computer program was used to develop computer models of the termination devices being tested. The computer program used was ANSYS, Rev. 4.4A (1990 copyright) by Swanson Analysis Systems of Houston, Pa., however there are other finite element programs that may be used to model the termination devices. The computer models were used to calculate numerical solutions for the stresses resulting from deformation of the fiber/resin composite interior of the termination devices during application of a load to the SMs. The purpose of the finite element modeling was to obtain comparative measures of computed stresses for each termination device design. Because the termination devices are solids of revolution, they were represented by axisymmetric finite elements. Geometrically, solids of revolution are formed by rotating a two-dimensional object about an axis that is located in the plane of the object but does not intersect the object. The axis about which the two-dimensional object is rotated is referred to herein as the axis of rotation. Using axisymmetric finite elements reduced the problem to two dimensions, rather than three dimensions. The termination devices were modeled with eight-noded, isoparametric, quadrilateral elements because these elements provide better solutions to problems including stress gradients or curved surfaces than do constant-stress, four-noded elements.

The computer models typically contained between 3000 and 4000 elements. The meshing density was adjusted so that increasingly finer elements were employed to model the shape of the termination device as geometric discontinuities or material interfaces were approached. The internal surface of each termination device was divided into at least 100 segments in each model.

There are several important features that must be included in the finite element models. The lack of friction at the internal surface of the termination device, the load being applied to the SM and the constituent material properties of the termination device and the fiber/resin composite must be included in the model in order to accurately represent the test terminations. The lack of friction at the internal surface of the termination device created by treating the actual test devices with mold-release agent was represented by imposing constraint equations upon each node pair of the computer model located on the internal surface of the termination device. To impose the constraint equations, a local coordinate system was created for each node pair on the internal surface of the termination device. Next, displacements normal to the internal surface of the termination device were equated for each node pair, while the tangential displacements were unconstrained. Boundary conditions of symmetry were applied to the axis of rotation and to the external surface of the termination device to which the load is applied. The outer cylindrical surface of the termination device was treated as traction free. Tensile load of 1000 lb. was applied to the end of the termination to represent a load being applied to a SM. The 1000 lb. load was applied in the form of negative pressure.

To represent the constituent materials of the termination devices and the fiber/resin composite, linear-elastic, isotropic material properties were assigned to all the constituent materials. For the termination devices, the assumption was made that the actual devices would be fabricated from steel having a yield stress greater than the maximum equivalent stress predicted by the computer model. The fiber/resin composite was represented by a single material having elastic properties volume-weighted in relation to the proportions of fiber and resin in the fiber/resin composite.

Using the computer models, static elastic solutions to the deformation problem of the terminations were obtained. The use of elastic modeling adequately indicated regions of stress concentration and predicted magnitudes of stress components that correlated well with observed experimental failure trends.

Table 1 below shows the maximum values of the stresses computed with finite element analysis for the fiber/resin composite interiors of the termination device designs considered. The data in Table 1 represent the maximum stresses computed for a 1000 lb. load. In Table 1, $\sigma_y$ represents the normal stress in the direction of the axis of rotation, $\sigma_{ry}$ represents shear stress in both the radial and longitudinal directions, $\tau_{max}$ represents the computed maximum shear and $\sigma_1$ represents the maximum principal stress. The maximum stresses are the factor most likely to promote failure within the termination devices.

TABLE 1

MAXIMUM STRESSES COMPUTED WITH FINITE ELEMENT ANALYSIS FOR FIBER/RESIN COMPOSITE INTERIORS OF TERMINATION DEVICE DESIGNS CONSIDERED, per 1000 lb LOAD

| Termination Design | Maximum Stress (ksi) | | | |
|---|---|---|---|---|
| | $\sigma_y$ | $\sigma_{ry}$ | $\tau_{max}$ | $\sigma_1$ |
| Conical, 0.5" D × 0.7" L | 44 | 13 | 31 | 48 |
| Conical, 0.5" D × 0.5" L | 45 | 14 | 31 | 49 |
| Conical, 0.4" D × 0.5" L | 55 | 16 | 48 | 63 |
| Blended, 0.4" D × 0.5" L | 48 | 15 | 40 | 58 |
| Neck, 0.4" D × 0.5" L | 36 | 12 | 27 | 66 |
| Arc, 0.4" D × 0.5" L | 32 | 6 | 19 | 34 |
| Arc, 0.36" D × 0.5" L | 33 | 6 | 20 | 34 |

The values in Table 1 were determined objectively by identifying peak stress values near locations where the stress gradients across elements of the models became excessive. Although stress intensity factors were not computed, the propensity for fracture to occur can be inferred by comparing the maximum principal tensile stress calculated for the various termination device designs.

The uniaxial yield stress (Y) of the polyester potting resin was determined in separate experiments. The separate experiments utilized compression of cast cylinders to determine the uniaxial yield stress at room temperature to be approximately 20 ksi. The shear yield strength of the resin "k" can be calculated using equation (1) below:

$$k = \frac{Y}{\sqrt{3}} \quad (1)$$

Substituting 20 ksi for "Y" in equation (1) yields k equal to approximately 12 ksi.

Figure 1A:
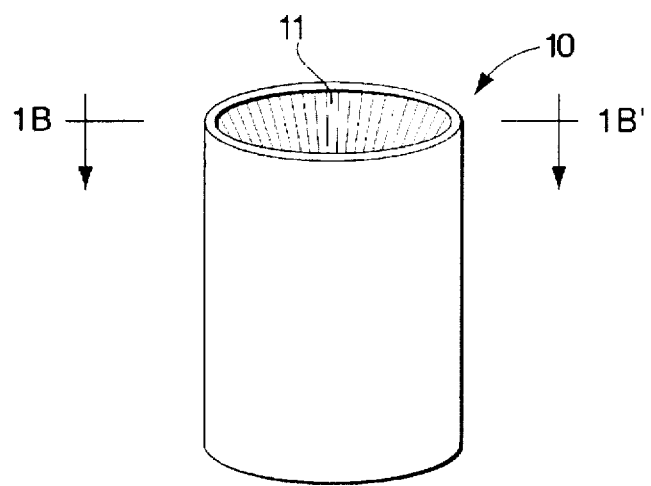
FIG. 1A is a perspective view of a prior art termination device having a straight-walled conical interior surface.
Figure 1B:
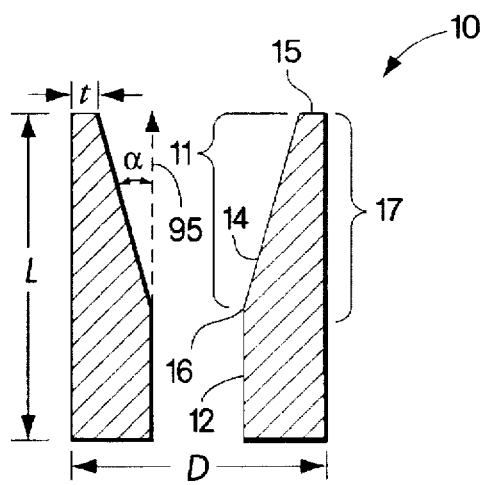
FIG. 1B is a cross-sectional view of the device of FIG. 1A taken through line 1B–1B' of FIG. 1A.

The data in Table 1 clearly indicate that the termination device design having the lowest computed maximum stresses is the constant-radius arc design described above and shown in FIGS. 2A and 2B. As shown in Table 1, all of the maximum stress values computed for the 0.4 in. diameter, constant-radius arc termination device were significantly lower than those of the other designs. All of the maximum stress values computed for the conical design were significantly greater than those calculated for the constant-radius arc design. The data in Table 1 also disclose that the computed stresses for the constant-radius arc termination devices were approximately a factor of two lower than the computed stresses for the conical termination devices having the same diameter. Reducing the diameter of the conical termination device from 0.5 in. to 0.4 in. resulted in elevations of all stress components. Increasing the overall length of the conical termination device from 0.5 in. to 0.7 in. decreased the computed normal stresses only slightly. Referring to FIGS. 1A and 1B, in one embodiment tested, the conical termination device had a blended region between the tapered wall 14 and the throat section 12 rather than a cusp 16. The cusp 16 of the conical termination device 10 was removed by blending the tapered wall 14 and the throat section 12. Smoothing the cusp of the conical termination device to form the blended design reduced the computed messes, but not sufficiently to compensate for the higher messes created by reducing the diameter of the device.

Referring to FIG. 6, in addition to the favorable computed stress magnitudes, the constant-radius arc termination devices 20 had a smoothly varying stress field which contained no region of concentration and decayed gradually from the second end 34 of the constant-radius arc termination device 20 to the first end 32. This feature, or result of the constant-radius arc termination device 20 is responsible for both the high efficiency and high reliability of the device 20 according to the invention. The maximum stress values calculated for the smaller constant-radius arc termination device having a diameter approximately equal to 0.36 in. were only slightly greater than the stresses calculated for the 0.4 in diameter termination device.

Experimental Procedures:

In addition to the finite element stress analysis, in a series of experiments, SMs fabricated from Kevlar®49 yarn having 1420 denier were used to test the efficiency of a variety of termination device designs. The SMs used in the experiments were approximately six (6) in. long, were approximately 0.20 inches in diameter, had been pretensioned to approximately 200 lb. and wrapped with shrink tape. Referring to FIG. 5, the SMs 70 used in the experiments consisted of a core layer of 98 untwisted, parallel yarns, with a single overbraid of 16 yarns. Under 200 lb. tension, the diameter $d_{sm}$ of SM 70 is 0.20 in., which results in a fill factor of 0.64.

During the experiments all failures of the SMs occurred at or within the termination device being tested, rather than in the mid-span of the SMs. The initial step in the design process was to determine the intrinsic strength of the SMs being used. The intrinsic strength of the SMs was obtained from measuring the break loads of sample SMs terminated with the most efficient devices known. The break or failure load is the minimum force that when applied to the SM causes the SM to fail. The maximum break load recorded in the series of experiments was 7407 lb. Assuming that the 98 parallel yarns comprising the SM carried all of the load evenly, the computed maximum fiber stress is approximately 420 ksi. Since the reported inherent strength of Kevlar®49 is 420 ksi (DuPont, 1991), the ideal break-strength of the SM was attained.

Figure 7A:
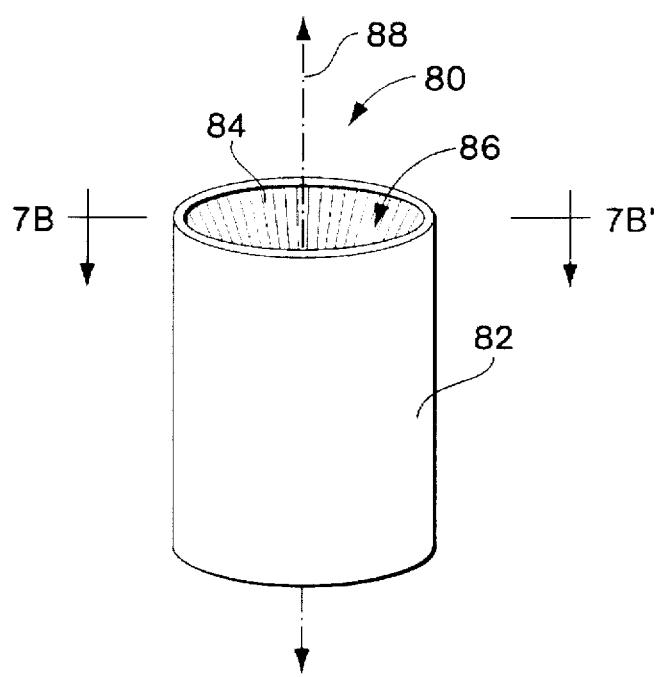
FIG. 7A is a perspective view of a termination device having a natural-neck internal profile.
Figure 7B:
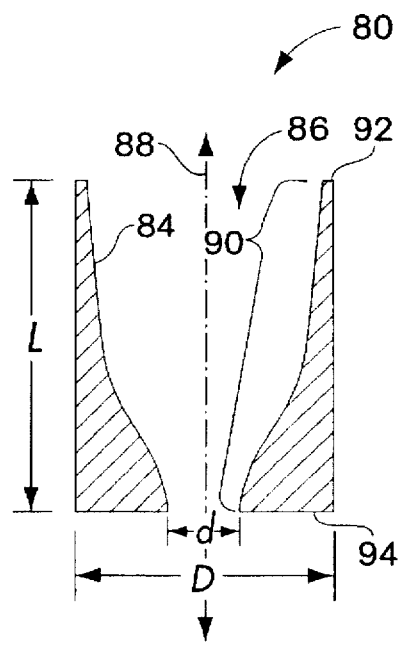
FIG. 7B is a cross-sectional view of the device of FIG. 7A taken through line 7B–7B' of FIG. 7A.

The termination devices tested included conical termination device 10 described above and shown in FIGS. 1A and 1B, constant-radius arc termination device 20 described above and shown in FIGS. 2A and 2B and natural-neck termination device 80 shown in FIGS. 7A and 7B. Referring to FIGS. 7A and 7B, the natural-neck termination device 80 includes a cylindrical external surface 82 and an internal surface 84. The internal surface 84 defines a passage 86 through the termination device 80. An axis 88 extends through the center of the passage 86. Referring to FIG. 7B, a cross-sectional view of the natural-neck termination device 80 shows the internal surface 84 having a natural-neck profile 90 extending from the first end 92 of the device 80 to the second end 94 of the device 80. The passage 86 at the second end 94 of the device 80 has a diameter "d" which is approximately equal to the diameter of the SM being terminated. The natural neck profile 90 is generated by the tensile straining of ductile rods.

The test terminations comprised a length of SM, two similarly shaped termination devices and potting resin. The termination devices 10, 20 and 80 were fabricated out of high-strength steels. Materials of lower strength could be used if the outer diameter "D" of the termination device is increased. The termination devices 10, 20 and 80 were machined with conventional and numerically-controlled lathe techniques. The loads were reacted with the test terminations through flat annular bottom surfaces. The termination devices 10, 20 and 80 were tested under quasi-static load conditions.

The termination devices were prepared by solvent cleaning and then coating the devices with several layers of teflon mold-release agent. For each termination device test shape, a taped SM was inserted into a pair of termination devices such that each end of the SM could be terminated with one of the two termination devices. The tape surrounding the ends of the SM was then removed from within the termination devices and the individual fibers of the SM broomed therein. Polyester potting resin was then applied to the individual fibers within the termination device with a syringe until the passage through the termination device was completely filled with resin. The polyester potting resin used in the series of experiments was Socket Fast Blue®, distributed by Phyllistran. However, other polymer potting resins may be used to fabricate the terminations. The procedures for fabricating the test terminations occurred at ambient temperatures, ranging from 20° to 24° Celsius. The test terminations were allowed to cure for a minimum of two days at ambient temperature prior to being tested. Once cured, the terminations were tested in a servo-hydraulic test machine at ambient temperatures.

To promote load-sharing among the fibers and yarns of the SM, a "conditioning" history of load was applied to each test termination prior to break-testing. The conditioning consisted of a sinusoidal waveform imposed upon a static tension 2500 lb. The amplitude of the waveform was 300 lb. and the waveform was applied to the test terminations at a frequency of 2 Hz for a total of 1000 cycles. After being conditioned, the test terminations were tested from zero load until failure, at a linear ramp rate of 100 lb/s. Data digitally recorded included load, load point displacement and strain, as measured with a strain-gauge extensometer.

The first shape of termination device tested was the conical termination device 10 described above and shown in FIGS. 1A and 1B. As discussed above, the conical termination device 10 has a straight, tapered internal wall 14 which forms a cusp 16 at the intersection of the tapered internal wall 14 with the cylindrical throat 12 of the conical termination device 10. One size of the conical termination devices 10 tested had an outer-diameter "D" approximately equal to 0.5 in., a length "L" approximately equal to 0.9 in., and a cone angle α of approximately 9 degrees. The cone angle α is the angle between the tapered internal wall 14 and a line 95 which is collinear with the cylindrical throat 12. The conical termination device 10 also had a minimum wall thickness "t" approximately equal to 0.020 in. The wall thickness "t" is the radial thickness of the termination device measured from the intersection of the tapered internal wall 14 with the first end 15 of the conical termination device 10. These dimensions were chosen based upon the equations D=3d and L=4–5d known in the art for designing conical termination devices. In these equations, "d" represents the diameter of the SM being terminated. The mouth section 12 fractured in virtually all of the conical test specimens. This fracture resulted from the fiber/resin composite moving within the conical termination device 10 during application of tension to the SM. Movement of the fiber/resin composite causes abrasive damage at the cusp 16 of the conical termination device 10. The abrasive damage at the cusp 16 promotes fracture of the mouth section 17. For the SM used in the series of experiments, the conical termination device 10 had an average failure load of approximately 6129 lb.

Another embodiment of the conical termination device 10 tested had an outer diameter "D" and length "L" both approximately equal to 0.5 in. and a cone angle α approximately equal to 18 degrees. These conical specimens failed through fracture at the mouth section 17 while shearing a portion of the fiber/resin composite within the conical termination device 10. Higher failure loads were measured with these conical terminations than with the longer conical terminations described above because the cone angle α of these termination devices was sufficient to prevent excessive generation of flaws at the cusp 16. Other embodiments of the conical termination device 10 tested had lengths "L" approximately equal to 0.70 in.

Failures in all of the conical termination devices emanated from the stress concentration at the cusp 16 where the tapered internal wall 14 intersects with the cylindrical throat 12. Tests demonstrated that modifying the conical design by blending the two straight lines 12, 14 with a curved transition region reduces the computed messes at the transition region, but does not improve the measured efficiency of the termination.

Table 2 below summarizes the average measured failure loads obtained from testing at least twelve samples of each termination device design and size examined during the series of experiments. The "plus/minus" range given for each entry in the table represents the standard deviation. Table 2 also summarizes the termination efficiencies (η) obtained during the experiments. The termination efficiencies (η) were calculated based upon the ideal break strength of the test SM which was previously calculated to be approximately 7400 lb. As discussed above, the tests were performed under ambient conditions with a linearly increasing load.

TABLE 2

AVERAGE FAILURE LOADS AND TERMINATION EFFICIENCIES MEASURED WITH SHORT SAMPLES OF 0.20-in. DIAMETER KEVLAR ® 49, PARALLEL-LAY STRENGTH MEMBER

| Termination Design | Break Load (lb) | η (%) |
|---|---|---|
| Conical, 0.5" D × 0.9" L | 6129 ± 308 | 83 |
| Conical, 0.5" D × 0.7" L | 6286 ± 330 | 85 |
| Conical, 0.5" D × 0.5" L | 6290 ± 484 | 85 |
| Conical, 0.4" D × 0.5" L | 5666 ± 208 | 76 |
| Blended, 0.4" D × 0.5" L | 5493 ± 216 | 74 |
| Neck, 0.4" D × 0.5" L | 4485 ± 330 | 60 |
| Arc, 0.4" D × 0.5" L | 6817 ± 198 | 92 |
| Arc, 0.36" D × 0.5" L | 5990 ± 240 | 81 |

As shown in Table 2, the conical profile terminations demonstrated efficiencies of approximately 85 percent. The failure loads of the three lengths of conical termination devices tested were also very similar. Increasing the length of the conical termination did not significantly increase the failure load. As demonstrated by the data in Table 2, reducing the outer diameter "D" of the conical termination device 10 resulted in reduced break load and reduced efficiency.

In one embodiment tested, the conical termination device had a blended region between the tapered wall 14 and the throat section 12 rather than a cusp 16. The cusp 16 of the conical termination device 10 was removed by blending the tapered wall 14 and the throat section 12. As illustrated by Table 2, this blended termination device had a failure load of approximately 5493 lb. and an efficiency of approximately 74 percent. Both of these figures are lower than figures obtained for the conical termination device having a similar outer diameter and length.

One embodiment of the natural-neck termination device, which is described above and shown in FIGS. 7A and 7B, having an outer diameter of approximately 0.4 in. and a length of approximately 0.5 in. exhibited an average break load of approximately 4485 lb. and an average efficiency of approximately 60 percent. This natural-neck design performed the poorest of all the designs tested. The constant-radius arc termination device 20 described above and shown in FIGS. 2A and 2B produced the highest average failure load and highest efficiency of all the designs tested. Twenty specimens were tested to determine the average failure load of each embodiment of the constant-radius arc device. Termination devices 20 having an outer diameter "D" of approximately 0.4 in., a length "L" approximately equal to 0.5 in. and an internal profile 30 forming a constant-radius arc having a radius "R" approximately equal to 1.4 in. demonstrated failure loads having an average of approximately 6817 lb. The standard deviation of +198 is less than 3 percent of the average failure load.

The data in Tables 1 and 2 above clearly demonstrate that the constant-radius arc design is the optimum design for the interior surface of termination devices.

Design Rules for Optimized Constant-Radius Arc Termination Devices:

An additional goal of the research effort was to formulate design rules which specify geometric details for optimized termination devices. Once the constant-radius arc design was determined to be the optimal interior shape, various sizes of this device were investigated to determine the optimum dimensions. Referring again to FIGS. 2A and 2B, the dimensions which directly influence the efficiency ($\eta$) of the constant-radius arc termination device 20 include the length "L" of the termination device and the radius "R" of the arc forming the interior profile 30 of the device. The outer diameter "D" of the termination device 20 is determined in response to L, R, and sufficient wall thickness t to avoid failure of the termination device itself. A method for calculating sufficient wall thickness t will be discussed in more detail below.

Table 3 below summarizes the average measured efficiencies ($\eta$) obtained from testing at least twelve samples of each of the constant-radius arc termination devices 20 tested during the series of experiments. The "plus/minus" range given for each entry in the table represents the standard deviation.

TABLE 3

AVERAGE MEASURED TERMINATION EFFICIENCY, $\eta$, OF CONSTANT-RADIUS ARC TERMINATION DEVICES USING 0.20 INCH DIAMETER KEVLAR 49, PARALLEL-LAY STRENGTH MEMBER

| Radius of | Mean Termination Efficiency, $\eta$ Length (L) (in) | | | |
|---|---|---|---|---|
| Arc (R) (in) | 0.40 | 0.46 | 0.50 | 0.60 |
| 1.10 | 75.7 ± 3.9 | | 98.4 ± 1.6 | |
| 1.40 | | 79.8 ± 3.0 | 92.0 ± 2.7 | 96.5 ± 1.5 |
| 1.63 | | | 80.8 ± 3.3 | 94.5 ± 3.0 |

Experimentation indicated that a constant-radius arc termination device having an outer diameter D approximately equal to twice the diameter d of the SM consistently generated efficiencies approximately equal to 92 percent. Perhaps the most striking data are the average efficiency of 98 percent obtained with the device having an arc radius R≡1.10 and L=D≡0.50. This is a truly remarkable result, considering that the length of the SM samples was only about six inches. The best results of known termination designs are typically obtained with sample lengths measuring tens of feet.

Table 4 below summarizes measured failure loads obtained with constant-radius arc termination device 20 having different dimensions.

TABLE 4

AVERAGE MEASURED FAILURE LOADS OF CONSTANT-RADIUS ARC TERMINATION DEVICES AS A FUNCTION OF INTERNAL ARC-RADIUS, AND LENGTH OF DEVICE

| Radius of | Mean Failure Load (lb) Length (L)(in) | | | |
|---|---|---|---|---|
| Arc (R) (in) | 0.40 | 0.46 | 0.50 | 0.60 |
| 1.10 | 5607 ± 289 | | 7294 ± 131 | |
| 1.40 | | 5915 ± 222 | 6817 ± 198 | 7149 ± 109 |
| 1.63 | | | 5990 ± 240 | 7001 ± 228 |

The data obtained demonstrate that for any given length L of the constant-radius arc termination device 20, the failure load rises with decreasing arc radius R. The data in Table 4 also demonstrate that failure loads rise with increasing length L for a constant arc radius R. Both of these trends result from increasing bearing surface, which enables a reduction of the peak stresses on the fiber/resin composite in the narrowest region of the termination.

Based upon the data in Tables 3 and 4, termination devices 20 having a profile 30 which is a constant-radius arc can be optimized to withstand a maximum load or to have a minimum diameter while consistently producing efficiencies greater than 90 percent.

Constant-Radius Arc Termination Devices with Minimum Diameter:

In one embodiment of the constant-radius arc termination device 20 according to the invention, the radius R of the arc is related to the diameter d of the SM according to equation (2) below.

$$7d \geq R \geq 5d \qquad (2)$$

In the same embodiment, the length L of the termination device 20 is related to the diameter d of the SM according to equation (3) below.

$$L > 2.5d \qquad (3)$$

In another embodiment, the radius R of the arc is related to the diameter d according to equation (4) below and the length L of the termination device is related to the diameter d according to equation (5) below.

$$7d \geq R \geq 6d \qquad (4)$$

$$L \equiv 2.5d \qquad (5)$$

Utilizing these design parameters to fabricate a constant-radius arc termination device 20 yields a termination device with the minimum outer diameter "D" that consistently generates an efficiency greater than 90 percent.

In one embodiment utilizing equations (4) and (5) to design the termination device, the internal arc profile 30 extends to the external surface 22 at the first end 32 of the termination device 20, thereby forming a "knife edge" with the external surface 22. Using geometry, the minimum outer diameter ($D_{min}$) of the "knife-edge" embodiment of termination device 20 can be calculated according to equation (6) below.

$$D_{min} = (2R+d) - 2\sqrt{R^2 - L^2} \approx 2d \qquad (6)$$

For example, for a knife-edge termination device having R=7d=1.40 in. and L=2.5d=0.50 in., the minimum outer diameter $D_{min}$ equals approximately 0.384 in. In this example, 2d equals 0.4 in. which is approximately equal to the 0.384 in. value calculated using equation (6). In another embodiment, a minimal amount of wall thickness "t" is added to the knife-edge termination device, which increases the outer diameter D (to, for example, 0.4 in.).

Decreasing the outer diameter D of the constant-radius arc termination device by increasing R and L outside of the parameters given by equations (4) and (5) above results in a reduction of load capacity. Increasing the length L of the constant-radius arc termination device without increasing the radius R, results in a rapidly increasing outer diameter D.

Constant-Radius Arc Termination Devices Generating Maximum Efficiency:

In another embodiment, the radius R of the arc is related to the diameter d of the SM according to equation (7) below and the length L of the constant-radius arc termination device is related to the diameter d according to equation (8) below.

$$6d \geq R \geq 5d \qquad (7)$$

$$L \geq 2.5d \qquad (8)$$

Utilizing these design parameters to fabricate a termination device yields a termination device with maximum efficiency. In one experiment, a constant-radius arc termination device, having R=5.5d=1.10 in. and L=2.5d=0.50 in. produced efficiencies greater than 98 percent with a standard deviation of less than 2% of the average failure load. The constant-radius arc termination devices utilized in this experiment were machined from a common 170-ksi steel (17-4 ph) to an outer diameter D of 0.50 in.. These termination devices suffered no plastic deformation during the experiments. Constant-radius arc termination devices having lengths greater than 2.5d did not produce higher efficiencies because termination devices having a length equal to 2.5d attained loads equal to the inherent strength of the SM. Loads greater than the inherent strength of the SM can not be attained because the SM would fail. The primary disadvantage of increasing the length L of the termination device is that the outer diameter D increases concomitantly.

In another series of experiments, SMs fabricated from a variety of materials were used to test the efficiency of a larger termination device designed according to equations (7) and (8) above. The purpose of the series of experiments was to determine the load-carrying capabilities of SMs fabricated from different materials. The termination device used in the series of experiments had d=0.635 in., D=1.75 in., R=3.75 in. and L=1.75 in. The SMs used had a diameter approximately equal to 0.625 in. The wall thickness of the SMs was approximately 0.025 in. The SMs were braided upon cable-like cores. The three different synthetic fibers used to fabricate the SMs were Kevlar 49, Technora, and Vectran. The experiments were performed at room temperature under quasi-static loading conditions. Table 5 below summarizes the calculated and average measured failure loads obtained from testing at least eight samples of each SM material examined during the series of experiments. The "plus/minus" range given for each entry in the table represents the standard deviation.

TABLE 5

CALCULATED AND AVERAGE MEASURED FAILURE LOADS OF CONSTANT-RADIUS ARC TERMINATIONS AS A FUNCTION OF SM MATERIAL

| | Failure Load (lb) | |
|---|---|---|
| SM Fiber Material | Calculated | Measured |
| Kevlar 49 | 10,560 | 9,215 ± 376 |
| Technora | 11,520 | 12,785 ± 552 |
| Vectran | 14,000 | 12,500 ± 2611 |

The efficiency of the termination devices terminating the SMs fabricated from Kevlar 49 can only be estimated to be above ninety percent because the Kevlar SMs consistently failed at the terminations. The efficiency of the terminations terminating the SMs fabricated from Technora clearly achieved 100 percent efficiency because the Technora SMs consistently failed in the mid-span of the SM or near the termination at loads exceeding the theoretical limit. The SMs fabricated from Vectran demonstrated wide scatter. The manufacturer of the Vectran SMs, Yale Cordage, attributed the wide scatter to be caused by fiber breakage during braiding. Nonetheless, two of the terminations terminating Vectran SMs demonstrated 100 percent efficiency.

Sizing and Material Selection:

The above discussion is mainly concerned with determining the optimum shape of the interior surface of the termination device. In addition to designing the internal shape of the termination device, to achieve the optimum termination device, the thickness of the termination device's walls "t" must be sufficient to prevent the termination device itself from failing. Referring to FIG. 2B, the wall thickness "t" is the radial thickness of the termination device 20 measured from the intersection 96 of the constant-radius arc profile 30 with the first end 32 of the termination device 20. As long as the metal composing the termination device does not fail, the load capacity of the termination is determined by the fiber/resin composite. Stresses within the fiber/resin composite are determined by the load applied to the SM and the shape of the termination device's interior surface.

Excessive circumferential stresses or "hoop stresses" resulting from large hydrostatic pressures developed within the fiber/resin composite cause the termination device to fail. Sufficient wall thickness "t" prevents the termination device from failing. For a given material strength ($\sigma_u$), a sufficient wall thickness "t" may be calculated according to the empirically derived equation (9), in which d is the diameter of the SM and L is the length of the termination device.

$$t = \frac{44_{kpsi}}{L} \cdot \frac{d^2}{\sigma_u} \qquad (9)$$

Tests have confirmed that termination devices designed according to equation (9) can be loaded to the failure load of the strongest readily available synthetic fiber SMs, without the termination device failing or deforming. One test termination device designed according to equation (9) had d=0.635 in., R=3.75 in. and L=1.75 in. A second test termination device designed according to equation (9) had d=0.238 in., R=1.400 in. and L=0.600 in. The outer diameter D of these designs was determined by the material used. Both of these test termination device designs were loaded to the failure load of the SM without failing or deforming. One material tested was stainless steel, PH 17-4 ($\sigma_u$=170 ksi). Steels with over twice the strength of 17-4 stainless steel can be used to produce termination devices having significantly smaller outer diameters while having a similar load capacity. Aluminum can be used for less expensive fittings. The drawback of using aluminum is that the termination devices will have a larger diameter. Sufficient wall thickness "t" for the chosen material is ensured by using the above equation to design the termination device. As used here and shown in FIG. 2B, "t" is the incremental wall thickness which increases the outer diameter D of the termination device 20 relative to the knife-edge diameter $D_{min}$ defined by equation (6) above. The total outer diameter D of the termination device can be calculated according to equation (10) below.

$$D = D_{min} + 2t \qquad (10)$$

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A termination device, comprising:

a first end, a second end located opposite the first end, and an internal surface defining a passage through the device, the internal surface having a profile which is a constant-radius arc extending from the first end to the second end of the device.

2. The termination device of claim 1 wherein an axis extends through the center of the passage and the radius of the arc emanates from a point along a line coplanar with the second end of the device and perpendicular to the axis.

3. The termination device of claim 2 wherein:

the device has a length L, the passage has a diameter d at the second end, and the arc has a radius R; and the radius R is related to the diameter d according to the equation $7d \geq R \geq 5d$, and the length L is related to the diameter d according to the equation $L \geq 2.5d$.

4. The termination device of claim 3 wherein the radius R is related to the diameter d according to the equation $7d \geq R \geq 6d$, and the length L is related to the diameter d according to the equation $L \geq 2.5d$.

5. The termination device of claim 3 wherein the radius R is related to the diameter d according to the equation $6d \geq R \geq 5d$, and the length L is related to the diameter d according to the equation $L \geq 2.5d$.

6. A termination device, comprising:

a first portion having a first end and a second end;

a second portion extending from the second end of the first portion; and an internal surface defining a passage through the first and second portions of the device, the internal surface of the first portion having a profile which is a constant-radius arc extending from the first end to the second end of the first portion of the device.

7. The termination device of claim 6 wherein an axis extends through the center of the passage and the radius of the arc emanates from a point along a line coplanar with the second end of the first portion of the device and perpendicular to the axis.

8. The termination device of claim 7 wherein:

the first portion of the device has a length L, the passage has a diameter d at the second end of the first portion of the device, and the arc has a radius R; and the radius R is related to the diameter d according to the equation $7d \geq R \geq 5d$, and the length L is related to the diameter d according to the equation $L \geq 2.5d$.

9. The termination device of claim 8 wherein the radius R is related to the diameter d according to the equation $7d \geq R \geq 6d$, and the length L is related to the diameter d according to the equation $L \geq 2.5d$.

10. The termination device of claim 8 wherein the radius R is related to the diameter d according to the equation $6d \geq R \geq 5d$, and the length L is related to the diameter d according to the equation $L \geq 2.5d$.

11. A method of terminating a flexible tensile strength member, comprising:

providing a termination device comprising a first end, a second end located opposite the first end, and an internal surface defining a passage through the device, the internal surface having a profile which is a constant-radius arc extending from the first end to the second end of the device;

inserting the flexible tensile strength member through the passage of the device;

coating an end of the flexible tensile strength member with a potting compound; and curing the potting compound.

12. The method of claim 11, further comprising:

filling the passage with the potting compound before the step of curing the potting compound.

13. A method of terminating a flexible tensile strength member, comprising:

providing a termination device comprising
    a first portion having a first end and a second end,
    a second portion extending from the second end of the first portion, and
    an internal surface defining a passage through the first and second portions of the device, the internal surface of the first portion having a profile which is a constant-radius arc extending from the first end to the second end of the first portion of the device;

inserting the flexible tensile strength member through the passage of the device;

coating an end of the flexible tensile strength member with a potting compound; and curing the potting compound.

14. The method of claim 13, further comprising:

filling the passage with the potting compound before the step of curing the potting compound.

* * * * *